United States Patent
Westhoven, Jr. et al.

[11] Patent Number: 6,016,659
[45] Date of Patent: Jan. 25, 2000

[54] REACTIVE THERMO ELASTIC CRYOSTAT

[75] Inventors: Lawrence A. Westhoven, Jr.; David R. Smith, both of Tucson, Ariz.

[73] Assignee: Raytheon Co., Lexington, Mass.

[21] Appl. No.: 08/961,533

[22] Filed: Oct. 30, 1997

[51] Int. Cl.$^7$ ................................................. F25B 19/02
[52] U.S. Cl. ............................................ 62/51.2; 62/51.1
[58] Field of Search ..................... 62/51.1, 51.2

[56] References Cited

FOREIGN PATENT DOCUMENTS

| | | | |
|---|---|---|---|
| 582817 | 2/1994 | European Pat. Off. | 62/51.2 |
| 2682178 | 4/1993 | France | 62/51.2 |
| 4235752 | 4/1994 | Germany | 62/51.2 |
| 4235757 | 4/1994 | Germany | 62/51.2 |
| 515003 | 5/1976 | U.S.S.R. | 62/51.2 |
| 567907 | 8/1977 | U.S.S.R. | 62/51.2 |
| 612131 | 6/1978 | U.S.S.R. | 62/51.2 |
| 653487 | 3/1979 | U.S.S.R. | 62/51.2 |

*Primary Examiner*—Christopher B. Kilner
*Attorney, Agent, or Firm*—David W. Collins; Andrew J. Rudd; Glenn H. Lenzen

[57] ABSTRACT

A cryostat (12) with an actuator (40) which reacts to sensed temperature changes via externally controlled thermal heating generated therein. The actuator (40) is constructed with material having a high coefficient of thermal expansion. A flexible heating element (44) is embedded in the actuator material. A temperature sensor (62) provides a signal to cryostat control electronics. Responding to the temperature signal, the control circuitry (60) regulates current to the heating element (44) in the actuator (40). As the actuator temperature increases due to the heat generated by the heating element (44), it expands and moves open an attached needle (50) relative to an orifice (30), thereby increasing cryogen flow and regulating cooling. When the desired cold temperature is attained, current and heating are stopped. Flowing cryogen cools the actuator which shortens the actuator and pulls the attached needle into the orifice to regulate flow. The heating and cooling cycle repeats itself when the sensed temperature rises to an unacceptable value. The heating element (44) provides the ability to control actuator heating. It provides greater sensitivity and travel by inducing actuator temperature change rates and magnitude significantly larger than cryogen changes in temperature, which limit passive actuator designs.

5 Claims, 1 Drawing Sheet

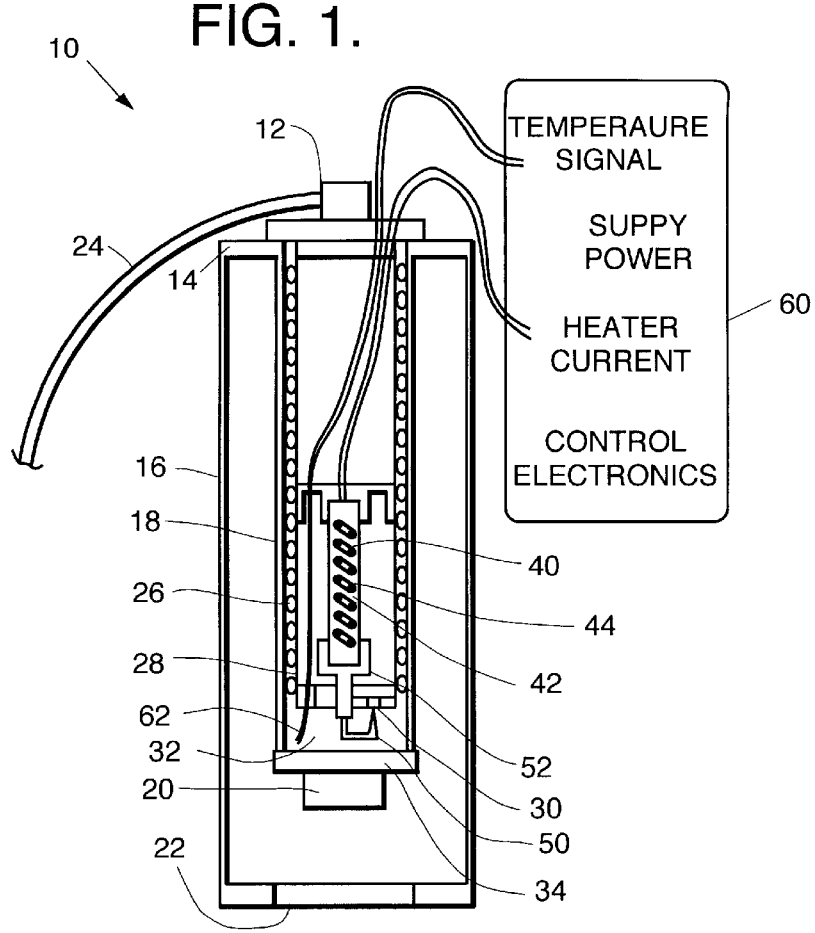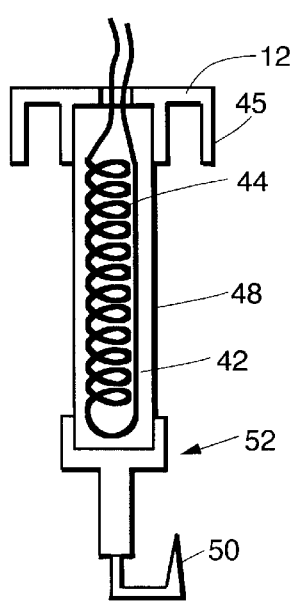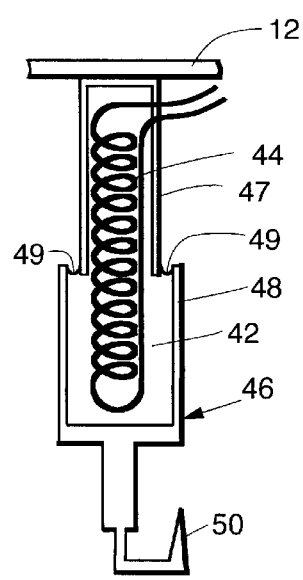

REACTIVE THERMO ELASTIC CRYOSTAT

BACKGROUND OF THE INVENTION

1. Field of the Invention

The present invention relates to Joule-Thomson cryostats. More specifically, the present invention relates to systems and techniques for improving the performance of Joule-Thomson cryostats.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

A cryostat is an apparatus which provides a localized low-temperature environment in which operations or measurements may be carried out under controlled temperature conditions. Cryostats are used to provide cooling of infrared detectors in guided missiles, for example, where detectors and associated electronic components are often crowded into a small containment package. Cryostats are also used in superconductor systems where controlled very low temperatures are required for superconductive activity.

A Joule-Thomson cryostat is a cooling device that uses a valve (known in the art as a "Joule-Thomson valve") through which a high pressure cryogen is allowed to expand via an irreversible throttling process in which enthalpy is conserved, resulting in lowering of its temperature.

The simplest form of a conventional Joule-Thomson cryostat typically has a fixed-size orifice in the heat exchanger at the cold end of the cryostat such that cooling by the cryostat is unregulated. The input pressure and internal cryogen flow dynamics establish the flow parameters of the cryogen through the cryostat. Unfortunately, as is well known in the art, rapid cool-down requires high rate gas flow and a large size orifice, while long cooling durations require demand flow, where flow refrigeration capacity just offsets heat load. With a passive fixed orifice cryostat, demand flow operation is not inherent and simultaneous rapid cooldown and long cooling duration are mutually exclusive. These two conditions cannot be simultaneously met in a fixed orifice cryostat. Accordingly, although the conventional Joule-Thomson cryostat is a simple apparatus in that it has no moving parts, the inherent, uncontrolled flow characteristics make the fixed-orifice type cryostat unsuitable for many applications where rapid cool-down and long cooling durations with limited cryogen are required.

Since approximately the 1950's, demand-flow Joule-Thomson cryostats with internal, passive, thermostatic control of variable orifice size have been used. These cryostats have fluidic throttling valves which provide the ability to start cool-down with the maximum orifice size, thereby providing high rate cryogen flow and refrigeration for rapid cool-down. After cool-down is achieved, the orifice size is reduced by the valve for minimal cryogen flow rate and sustained cooling for the thermal load. The fluidic throttling valve generally includes a passive thermostatic actuator within the mandrel of the apparatus which provides self-regulation of cryogen flow based upon the temperature in and around the cryogen plenum chamber. The cooling rate is proportional to the mass flow rate of cryogen through the cryostat. The thermostatic element is conventionally a fluid-filled bellows or a segment of specifically selected monolithic actuator material which contracts or expands as the temperature changes. As the actuator changes temperature, it changes length either due to a phase change in the bellow's charge fluid, or it changes length due to the material's expansion properties.

The thermostatic actuator is coupled to a demand-flow needle valve mechanism. As the temperature drops, the actuator is adapted to contract and cause the needle to extend into and partially close the Joule-Thomson orifice. At the predetermined critical temperature, the thermostatic element closes the needle valve entirely. As the temperature rises, the element expands again and actuates the valve mechanism, allowing new cryogen flow through the orifice and ultimately to the heat load.

Many applications, such as missile applications, require low sustaining flow rates to achieve long required run times. The allocated mass and volume of either a pressure vessel source or a compressor source for this type of application is aggressively minimized because of vehicle constraints, thus cryogen supply is limited. These applications spurred the development of cryogen efficient demand flow cryostats, where flow refrigeration capacity equals heat load over all environmental conditions. As a result, during low heat load conditions such as low environmental temperatures, cryogen flow diminishes to very low values and the needle valve becomes almost closed.

Coincident with sustaining operation at low flow conditions, a thermostatic actuator requires relatively large travel to fully open the needle valve and achieve high initial flow rates for quick cooldown. Cryostats that perform best for these conditions incorporate bellows type thermostatic actuators requiring exacting fabrication, charge fluid parameters and initial valve adjustment.

A technique to provide a minimum flow rate is to incorporate a flow bypass within the needle valve. This typically consists of a slight channel in either the needle valve's needle or orifice which leaks cryogen when the valve is fully seated. Although this feature prevents extremely low flow, flow is set low to prevent excessive cryogen consumption. This feature is also difficult to fabricate consistently.

The critical problem with this type of cryostat and all cryostats exhibiting low flow rates is a lack of reliability. For many reasons, flow can be interrupted and the controlled temperature increases unacceptably before the actuator responds and flow is resumed. The most persistent problem is cryogen contamination. Impurities in the cryogen precipitate out which blocks the orifice and/or seizes the needle, inhibiting valve operation and the flow of cryogen. Additionally, the cryogen itself can precipitate out upstream of the orifice and subsequently disrupt needle valve operation. This specific phenomena is most prevalent right after cooldown when excess coolant is produced and is mostly associated with Argon operation. The response time of the thermostatic actuator is too long to prevent flow interruption of sufficient duration to cause unacceptable temperature rise.

Further, bellows type cryostats must maintain a very good seal over design life and bellows are difficult to manufacture to the specifications a cryostat application requires. Designs that utilize a material's coefficient of thermal expansion (CTE) are simpler than bellows design, but have the disadvantages of low sensitivity and slow thermal response. This limits the reliability of such designs at low flow rates and at all but the highest purities of cryogens.

In addition to bellows type cryostats, cryostats which utilize a monolithic high CTE elastomeric material have been developed. See U.S. Pat. No. 4,152,903, issued May 8, 1979 to Ralph C. Longsworth and entitled Bimaterial Demand Flow Cryostat, the teachings of which are incorporated herein by reference. This design attains rapid cooldown and low sustaining flow rates, but proved to be less than fully reliable at low flow rates. Its performance is sensitive to the quality of the cryogen to the point where it is impractical for most applications. And, although this type of actuator can be carefully adjusted for one type of cryogen, it is not amenable for multiple cryogen types.

Another attempt to attain rapid cooldown and reliable long run times was to incorporate a semi-active actuator. This approach is described and claimed in U.S. patent application Ser. No. 08/469,163, filed Jun. 6, 1995 by Matthew Skertic et al., and entitled Adaptive Orifice Joule-Thomson Cryostat With Servo Control (PD 92396), the teachings of which are incorporated herein by reference. The actuator is a wire whose material changes phase near the cryostat operating temperature. With the change in phase, the material significantly changes length. The change in length operates the needle valve in the same manner as a bellows operates the needle valve. When current is passed through the wire, the wire heats and changes temperature. By externally controlling the application of current, heating of the wire is controlled and needle opening or closing is thereby controlled. The difficulties with this approach are that the wire presents structural problems. Maintaining tension in the wire and making the design work in dynamic environments are stressing requirements.

Thus, a need exists in the art for a responsive thermo-active element for a Joule-Thomson cryostat which affords rapid cooldown, reliable demand (low) sustaining flow rates, and operation with multiple cryogen types. In addition, there is a need for a selfcleaning cryostat offering robust performance handling a range of cryogen impurities at low cryogen flow rates.

SUMMARY OF THE INVENTION

The need in the art is addressed by the cryostat of the present invention which provides improved temperature control performance, reduced sensitivity to cryogen type and impurities and potentially lower cost than existing designs. The cryostat of the present invention replaces the passive actuator of the prior art with an actuator which, in addition to passively responding to changes in cryogen temperature, reacts to remotely sensed temperature via externally controlled thermal heating generated therein. In the most general sense, the actuator is constructed with a polymeric material having a high coefficient of thermal expansion and an embedded thermal stimulus. In the illustrative embodiment, the actuator is a Reactive Thermal Elastic Cryostat, or RTEC.

In a specific embodiment, the invention utilizes an embedded flexible heating element in a specifically selected CTE actuator material. A control temperature sensor provides a signal to cryostat control electronics indicating a temperature change in the device being cooled. Responding to the temperature signal, the control electronics regulates current to the heating element in the actuator. The actuator temperature rapidly increases due to heat generated by the heating element. The actuator expands and opens the needle valve overcoming any flow obstruction to restore flow. When the desired device temperature is attained, current and heating are stopped. The flowing cryogen gradually cools the actuator which gradually shortens and pulls the attached needle into the orifice to regulate flow. When the sensed temperature rises to an unacceptable value, the heating and cooling cycle repeats itself. The heating element provides the ability to accelerate actuator heating. It provides faster and greater travel by producing actuator temperature rate and magnitude changes significantly larger than passively responding actuator designs.

BRIEF DESCRIPTION OF THE DRAWINGS

FIG. 1 is a sectional side view of a portion of the inventive cryostat system of the present invention as mounted in a typical dewar.

FIG. 2 is a sectional side view of the actuator assembly of the present invention.

FIG. 3 is a sectional side view of the constrained elastomeric polymeric actuator of the present invention, which is variant of FIG. 2.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 shows the inventive cryostat system installed in a typical detector-dewar assembly. FIG. 2 details the cryostat actuator sub-assembly, which is the inventive cryostat feature. FIG. 3 details a variant of the actuator sub-assembly, which incorporates an additional inventive actuator feature.

FIG. 1 is a sectional side view of a portion of the inventive cryostat system of the present invention. The system 10 includes a cryostat 12 disposed within a dewar 14. The dewar 14 has an outer wall 16 within which a cold well 18 is provided. A detector 20 is mounted on the cold well end 34. The detector assembly 20 typically includes an array of infrared detectors which receive input energy via a dewar window 22 provided in the outer wall 16 of the dewar 14. The detector assembly 20 is maintained at cryogenic temperatures by the cryostat 12. A coolant such as high pressure Argon, Nitrogen, Air or any combination thereof is supplied via a cryogen inlet 24 into a recuperative finned tube heat exchanger 26 that encompasses a support mandrel 28.

The heat exchanger 26 basically comprises counterflow finned metal tubing wrapped around the mandrel 28. It allows high pressure inlet cryogen to be cooled by exhaust cryogen as inlet cryogen flows towards the expansion orifice 30. The heat exchanger 26 terminates in the expansion orifice 30 at the end of the mandrel 28. The expansion orifice 30 acts as a Joule-Thomson fluid throttling valve. As the cryogen passes through the expansion orifice 30 and enters the surrounding cryogen plenum 32, it expands to a low pressure, low temperature fluid which can consists of both liquid and gaseous phases. Evaporation of fluid and convection heat exchange to the low temperature gas are the principle heat transfer modes that cool the intimately contacting coldwell 34-detector assembly 20. The fluid is sprayed from the orifice 30 onto the coldwell end 34 to maximize fluid-detector assembly 20 heat transfer. The fluid then exhausts through the finned tubing heat exchanger volume cooling the inlet cryogen as it flows over the heat exchanger 26. As long as the fluid consists of both liquid and gas phases, temperature will be maintained at the cryogen saturation temperature for the existing back pressure, which is usually slightly above one atmosphere. When the refrigeration capacity of the cryogen flow matches the dewar assembly 16 total heat load, demand heat flow is achieved. Flow in which refrigeration capacity exceeds heat load maintains temperature at the saturation temperature, but wastes cryogen and reduces runtime.

A thermostatic actuator is designed to provide self-regulation of gas flow based upon the fluid temperature in and around the cryogen plenum. When cryogen flow is insufficient the detector assembly temperature rises, the cryogen becomes superheated gas and heats the thermostatic actuator. The actuator changes length and varies cryogen flow rate by exercising the needle valve. As the actuator cools, it contracts and reduces flow. Thus passive regulation of flow is achieved.

The addition of the embedded heating element 44 in the RTEC actuator 40 provides a controllable means to heat the actuator 40 and affect flow through the needle valve. The control flexibility enables typical catastrophic events such as impurity obstructions to be mitigated. The temperature of the detector assembly 20 rises when contamination or cryogen precipitation perturbs flow and causes unstable self-regulation. The temperature rise is detected by a temperature sensor 62 and triggers the control electronics 60. The control electronics 60 determines and controls current supplied to the embedded heating element 44 in the actuator 40. The heater 44 rapidly increases the actuator material 42 temperature, which in turn rapidly expands. The expansion forces the expansion orifice 30 open restoring cryogen flow sufficient to cool down the detector assembly 20. The restored cooling prevents the detector assembly 20 from warming unacceptably and the flow obstruction is blown out of the opened expansion orifice 30.

Actuator heating is terminated when the detector assembly 20 temperature is determined to be at or near its operating temperature. After the perturbation the cryostat returns to normal self-regulation mode or returns to a predetermined continuous openclose cycling mode.

FIG. 2 is a sectional side view of the polymeric actuator assembly of the present invention. The actuator element 40 consist of a rod like length of actuator material 42 having a high coefficient of thermal expansion (CTE) within which a heater element 44 is embedded. The actuator element is attached to the mandrel 28 via an intermediate support 45 at the fixed end. A needle adapter 52 which accepts the needle 50 is mounted on the free end. The actuator construct 42 can be made of a variety of materials. The construct 42 provides the appropriate level of thermally induced movement required to actuate the cryostat needle 50 and provides appropriate structural integrity for operation in dynamic environments. Materials such as epoxies, silicones, and polyurethanes or any thermosetting or thermoplastic polymer with appropriate CTE and rigidity could be employed. The rod can be manufactured by casting the part with the heater element embedded therein in a plastic tube, curing the material, then removing the plastic tube. Those skilled in the art will appreciate that other manufacturing methods may be used.

As is common in the industry, the needle 50 is connected to the actuator 40 by an adapter 52. The control needle 50 is L-shaped, made of an appropriate metal and is adapted to reciprocate into and out of engagement with the orifice 30 when actuated by the actuator 40.

In the illustrative embodiment, the heating element 44 is a coil of resistive wire of nichrome or other suitable metal of 36 to 24 gauge. The heating element 44 transitions from nichrome to regular electrical wire at the actuator surface and runs through the center of the cryostat 12 and out the aft end thereof to the control electronics 60.

A design variant of the actuator assembly is shown in FIG. 3. To enhance the effective linear CTE of an elastomeric polymer, it utilizes overly constraining the actuator material to force expansion in one desired direction. The unrestrained surface is forced to expand to compensate for the expansion that would otherwise be occurring at the restrained surfaces if they were not restrained. It utilizes the principle of an elastomer behaving as an incompressible material undergoing a volume change within a semiconstrained vessel. The actuator (with embedded heating element 44) is constrained within a container 46 constructed an appropriate metal or other suitable low CTE material. As shown in the illustration, the container 46 is of a two part construction with an upper portion 47, a lower portion 48 and an expansion joint 49 therebetween. Essentially all expansion of the actuator material is forced to occur at the expansion joint 49 which significantly increases the materials volumetric expansion property. The lower portion 48 of the container 46 is connected to a control needle 50 as previously described. The core feature and benefit of an embedded flexible heating element are retained.

Current to the heating element 44 is provided by control electronics 60. The electronics 60 may be a shared microprocessor, a dedicated integrated circuit assembly, or an assembly made of discrete components as will be appreciate by one of ordinary skill in the art. The control electronics 60 receive a signal from a conventional temperature sensor 62 disposed in the plenum 32 in the space between the end of the cryostat 12 and the dewar coldwell end 34. The temperature signal could also be provided from a temperature sensor mounted in the dewar 14 near the detector assembly 20. Alternatively, a temperature signal could be deduced from video information via discrimination of a degraded video parameter, such as noise caused by rising detector temperature.

In applications utilizing a temperature sensor 62 located in the plenum 32, the temperature sense wires run up the center of the cryostat out to the control electronics 60. The control electronics 60 utilize the temperature sensor signal to regulate heater power. The details of the regulation is constructed based upon the characteristics of the thermal system. At a minimum, power is provided when the temperature is too high and halted when the temperature drops sufficiently. Some cryostat applications permit a design approach where the actuator cycles between an open position and a closed position. The closed position can incorporate a built in leak as previously discussed that serves to facilitate cycling optimization.

The implementation of a controlled heating element within a thermostatic actuator provides vary fast actuator thermal management and resulting flow regulation. The invention provides flexibility in design by allowing for the selection of specific coefficient of thermal expansion transducer materials, which, for many polymeric materials, can be large. The actuator material structurally supports the heating element and is robust under dynamic environments. The actuator material CTE is the CTE parameter that controls needle movement, and thereby eliminates the need for the heating element itself to have a specific CTE. Properly constraining an elastomeric polymeric material in a restricted volume is a technique that can further increases its effective CTE by up to a factor of three. Control of the flow regulation needle is tightly coupled to the temperature being controlled via the temperature sensor and rapid thermo-mechanical actuator response. A wide range of actuator materials are available to obtain desired overall travel sensitivity and other thermal characteristics.

Additionally, much greater actuator travel can be achieved because materials with high CTE's can be incorporated into the design. Utilizing induced heating, the actuator can be forced to vary in temperature much more than in passive actuator designs. The product of greater actuator CTE and induced temperature changes result in much greater actuator, or needle travel. This quantum increase in cryostat sensitivity, which is needle movement versus cryogen temperature change, is very desirable. First, cool down time can be improved by starting with the needle in a more open position. This allows higher initial flow rates which reduce cool down time. Second, if the orifice is blocked by precipitation or contamination, the needle can be driven to a significantly more open position. This allows the precipitation or contamination to blow through quickly enough to prevent an unacceptable temperature rise. Thus, the increased needle travel and quick response time makes the design much more robust for the presence of impurities in the cryogen. And, because lower cryostat flows increase clogging due to impurities, this selfcleaning cryostat feature allows reliable performance with low steady state flow settings.

Another important performance advantage is that the inventive design is much less sensitive to the variant of cryogen being supplied. The inventive actuator's behavior is not solely dependent upon complex cryostat/dewar/cryogen thermal, thermodynamic and fluid dynamics characteristics inherent with a passive system. Its behavior is also less sensitive to variation in cryogen supply and environmental conditions, which exacerbate performance dependencies. The ability to monitor the temperature being regulated and actively control a performance dominating thermal property with external intelligence makes performance much more manageable. This increased performance manageability enhances the cryostats capability to operate with the multiple cryogens and to operate with varying supply and environmental conditions.

The increased actuator travel and sensitivity of the inventive design not only provides performance robustness, but relieves the difficulty of achieving critical initial flow settings during manufacture. This and its greater performance robustness, decreases the current need for extensive in-process and acceptance testing. Because the highest cost elements of cryostat manufacture are associated with flow setting, testing and poor yield, the reductions of these design cost elements are potentially greater than the additional costs for the control electronics and temperature sensor necessary for the inventive design. Overall system costs can be reduced because of the improved reliability of the cryostat and the potential relaxation of system requirements such as cryogen purity. These factors could be significant over the life of a host system.

The present invention has been described, herein with reference to a particular embodiment for a particular application. Those having ordinary skill in the art and access to the present teachings will recognize additional modifications, applications and embodiments within the scope thereof. For example, a tube design could be used for the actuator instead of a solid cylinder. The heating element would be disposed within the cylinder and cryogen would be allowed to flow outside of the tube. This would relieve the need to embed the heating element within the actuator material. Another approach would be to coil a flat heating element and coat the surface of same with a high CTE elastomer. This approach minimizes thermal mass thus making the cryostat faster and more energy efficient. The invention can also employ a polymer that is trapped in a confined space. Clearly, those skilled in the art will appreciate that optimization of the design for a specific application could take several forms.

It is therefore intended by the appended claims to cover any and all such applications, modifications and embodiments within the scope of the present invention.

Accordingly,

What is claimed is:

1. A cryostat system comprising:
   valve means for controlling a flow of cryogen into a plenum chamber between an end of the cryostat and a dewar coldwell end;
   means for actuating said valve means including:
      temperature sensitive means including a rod of polymeric material having a high coefficient of thermal expansion for actuating said valve means in response to temperature and
      means for applying heat to said temperature sensitive means, said means for applying heat including a coil of wire embedded in said rod;
   sensor means disposed in said plenum chamber for sensing temperature in said cryostat and providing an electrical signal in response thereto; and
   circuit means responsive to said signal for actuating said means for applying heat to said temperature sensitive means.

2. The invention of claim 1 further including a container for retaining said rod.

3. The invention of claim 2 wherein said container includes an expansion joint.

4. The invention of claim 2 wherein said valve means includes a needle valve for closing an orifice.

5. The invention of claim 4 wherein said container is attached to said needle valve.

* * * * *